(12) United States Patent
Buller (10) Patent No.: US 7,092,504 B1
(45) Date of Patent: Aug. 15, 2006

(54) METHOD AND SYSTEM FOR PRESENTING DATA STORED WITHIN A NETWORK COMPONENT

(75) Inventor: Victor A. Buller, Grandview, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 485 days.

(21) Appl. No.: 10/391,123

(22) Filed: Mar. 18, 2003

(51) Int. Cl.
*H04L 12/28* (2006.01)

(52) U.S. Cl. ............... 379/221.1; 379/219; 379/229

(58) Field of Classification Search ......... 379/221.1, 379/229, 230, 111, 112.01, 219, 242, 245, 379/1.01, 2, 9.04, 14.01, 220.01; 455/461
See application file for complete search history.

(56) References Cited

U.S. PATENT DOCUMENTS

| | | | | |
|---|---|---|---|---|
| 5,084,816 A | * | 1/1992 | Boese et al. | 395/575 |
| 5,521,902 A | * | 5/1996 | Ferguson | 370/13 |
| 6,006,098 A | * | 12/1999 | Rathnasabapathy et al. | 455/461 |
| 6,038,218 A | * | 3/2000 | Otsuka et al. | 370/236 |
| 6,269,396 B1 | * | 7/2001 | Shah et al. | 379/113 |
| 6,282,267 B1 | * | 8/2001 | Nolting | 379/32.03 |
| 6,430,150 B1 | * | 8/2002 | Azuma et al. | 370/218 |
| 6,690,787 B1 | * | 2/2004 | Gradischnig | 379/229 |
| 2001/0045952 A1 | * | 11/2001 | Tenev et al. | |
| 2002/0112050 A1 | * | 8/2002 | Ullmann et al. | |
| 2004/0052240 A1 | * | 3/2004 | Stahl et al. | |
| 2004/0141514 A1 | * | 7/2004 | Delaney et al. | |
| 2004/0193705 A1 | * | 9/2004 | To et al. | |

* cited by examiner

*Primary Examiner*—William J. Deane, Jr.

(57) ABSTRACT

A method, system, and medium for retrieving information stored within a telecommunications-network component is provided. The method includes presenting component information to a user in response to providing one or more links upon which to derive information. The present invention can optionally ensure integrity of the data provided and automatically present information about the communications links entered as well as other signal-transfer-point information. This information includes one or more processor components that service the link as well as all other links serviced by the processor(s). The query results are presented in an easy-to-understand format on a display device via a user interface.

31 Claims, 6 Drawing Sheets

METHOD AND SYSTEM FOR PRESENTING DATA STORED WITHIN A NETWORK COMPONENT

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer programming. More particularly, the present invention provides a new and useful method to efficiently trouble-shoot data-links in a telecommunications networking environment.

BACKGROUND OF THE INVENTION

Telecommunications networks transmit data through switches. A switch receives a signal and then transfers the signal toward its destination. Signals include data signals as well as conventional voice-grade telephone calls. Almost all calls are routed across the globe via switches. Public telecommunications voice networks use Signaling System 7 (SS7) to exchange information for wire line and wireless call setup, routing, and control. SS7 is an out-of-band messaging network that finds a path for every call and supports numerous products with adjunct databases (calling cards, 800 numbers, etc.). By using the out-of-band channel, SS7 networks relieve the load-bearing switches of call setup duties. The SS7 network includes a series of nodes called Signaling Points (SP). The Signal Transfer Point (STP) is one of these signaling points but also includes any point hardware and/or software, where a signal is transferred.

Switches are connected to other switches via communications links (links). Data flows through these links to reach their destinations. The links typically terminate inside an STP. An STP also houses subcomponents responsible for routing data packets such as SS7 packets. When a link fails, calls may possibly get rerouted but can ultimately be blocked. As links fail, traffic is supposed to be rerouted to alternative switches. This rerouting, however, does not always occur. As traffic continues to be routed to an STP that cannot handle it, eventually data cannot pass through the links. Historically, diagnosing the source of faulty links has been a tedious, cumbersome, time-intensive, and expensive process.

Links are associated with processing devices inside the STP. These processing devices can control other processing devices which are associated with still other links. Troubleshooting faulty links absent the present invention—often consumes upwards of forty-five minutes to an hour or more. Meanwhile, the traffic that is supposed to be routed across the downed links, including "911" calls for example, may not be arriving at its intended destination. Emergency calls such as "911" calls may not get through to the proper authorities. Internet traffic can become or remain disrupted. As long as the problem within an STP cannot be remedied, the integrity of data communications is impaired and diminished To diagnose the problem that is causing traffic to be blocked, an analyst would manually enter a multiplicity of commands to gather link information stored within the STP. The analyst would then attempt to remotely submit the commands from a distant location. But bandwidth to the switch, even today, is limited. Moreover, the switch is often slow to respond as it tries to process the remote commands while under duress from the additional data to process.

As the analyst would enter switch commands to determine information about the STP, [s]he manually writes down the information, which includes data related to the processor devices within the STP. If data can be gathered about the various processors, then a commonality may surface that leads to a source of the communications problems. Identifying this commonality required the tedious and repetitious entering of remote commands to derive information related to link numbers. Link numbers are numbers associated with links or link cards where the links terminate. A typical switch may have 720 or more link numbers.

The analyst would enter commands to display a link route associated with a link number that may be down. These commands are often proprietary and must be memorized or known by the analyst. Next, the analyst would try to determine which processor is associated with corresponding links. After the processor is identified, the analyst would enter additional commands to determine all links associated with that processor. The analyst would manually attempt to decipher a pattern whereby faulty links could be associated with a common processor. Accordingly, if multiple processors were causing problems, then the process would have to be repeated for each processor device.

Even if fault links were seemingly associated with a common processor device, the processor device may not be the cause of the problem. In instances where the processor devices operate in a hierarchy, a top-level processor may be faulty. If a top-level processor is faulty, then a false-negative may be observed. That is, although a lower-level processor may appear to be faulty because no traffic is getting through it, that processor may not be faulty, but its corresponding higher-level processor may be faulty.

The current state of the art could be improved by providing a method that enables link-identification information stored in an STP to be rapidly retrieved. This link information can then be used to more quickly diagnose and correct communications problems.

SUMMARY OF THE INVENTION

The present invention solves at least the above problems by providing a system and method for keeping data flowing through a telecommunications network by retrieving link information stored in a switch (an exemplary STP). The present invention enables this link information to be rapidly correlated with a faulty processor device, which may be responsible for communications-link outages. The present invention allows for multiple lookups within a few seconds. A troubleshooter need only know which links, or a partial list thereof, are in a fault state.

The present invention has several practical applications in the technical arts not limited to enabling a rapid determination of all links associated with the various processor components within an STP or other device. This rapid determination of all links associated with certain processor components enables an analyst to determine the source of the problem. When processor components of the STP enter a fault state, the probability of calls and data not connecting increases.

The present invention stores a desired amount of information about the STP in a computer-readable medium. A user can provide one or more links upon which to derive information. The present invention can optionally check the integrity of the data provided and automatically present information about the links entered as well as other STP information. This information includes one or more processor(s) that service the link as well as all other links serviced by the processor(s) and is presented in an easy-to-understand format on a display device via a user interface. Automatically, presenting this information greatly reduces troubleshooting time.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides access to information stored with a telecommunications-network component without the need to be tethered to the network. Commonalities associated with faulty components can be easily and rapidly observed rather than manually and laboriously pieced together. Rapidly observing commonalities of faulty components leads to more speedy repairs, which improve the integrity of communications networks by keeping data flowing to their intended destinations.

Acronyms and Shorthand Notations

Throughout the disclosure of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CCD | Common Channel Distributor |
| CCLK | Common Channel Link (Processor) |
| PC | Personal Computer |
| SCSW | Super Cluster SWitch |
| SS7 | Signaling System 7 |
| STP | Signal Transfer Point |
| TNC | Transport Node Controller |

Further, various telecom technical terms are used throughout this disclosure. A definition of such terms can be found in *Newton's Telecom Dictionary* by H. Newton, 18th Updated and Expanded Edition (2002). These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Data-Retrieval

Figure 1:
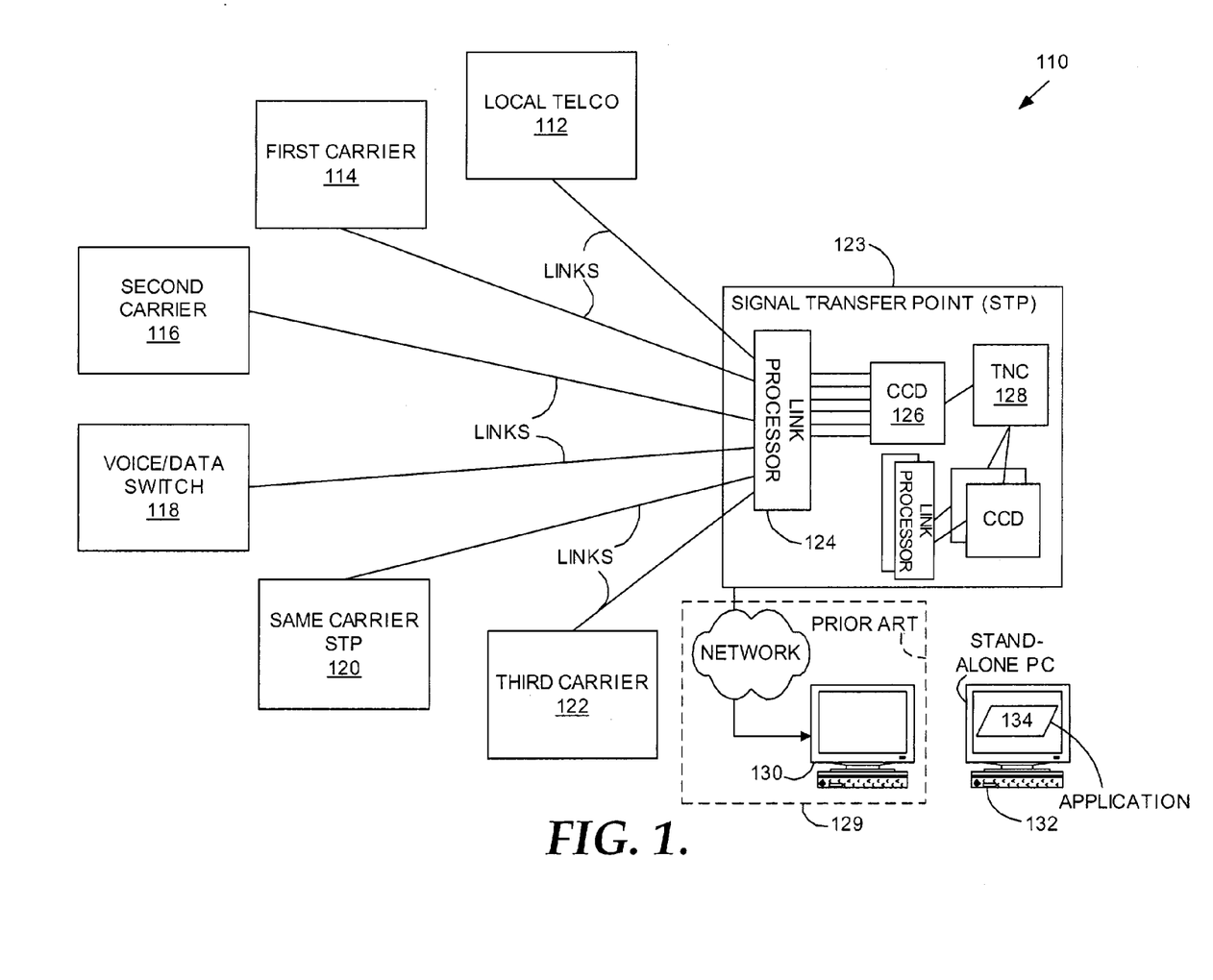
FIG. 1 is a block diagram depicting a suitable operating environment for practicing the present invention.

As previously mentioned, the present invention is, among other things, a computer-program product that includes an application to rapidly present link information of an STP. FIG. 1 represents an exemplary operating environment 110 for practicing the present invention. Operating environment 110 includes an exemplary group of devices connected to a signal transfer point (STP). Exemplary devices and components include a local telephone company 112, a first carrier 114, a second carrier 116, a voice/data switch 118, a signal transfer point of the same carrier 120, and a third carrier 122. Those skilled in the art will appreciate that a carrier is a provider of telecommunications services. Typically, carriers are owned by competing companies. In the exemplary operating environment 110, the various switches and components 112–122 are connected via SS7 links to STP 123. FIG. 1 is illustrative in nature and it should be clear that the components depicted are merely exemplary. Tens or hundreds of components of various natures and complexities can connect to an STP such as STP 123.

All of the links enter STP 123 by way of a link processor 124 in this embodiment. Each link processor 124 is assigned to a common channel distributor pair (CCD) 126. Although the term "CCD" is used herein, the functionality of CCD 126 is to facilitate data management within STP 123. Thus any component that manages data within an STP is contemplated within the scope of the present invention. Exemplary data management functions include data routing, congestion resolution, gateway screening, and gateway billing.

Whenever a CCD pair 126 is out of service, the associated signaling links are affected. The signaling links can be assigned link numbers via the link processor 124 and translated to CCD pair 126. CCD pair 126 is coupled to a transport node controller (TNC) 128. The TNC 128 provides an interface between a switching matrix (Ethernet for example) and the SS7 clusters. An SS7 cluster is a grouping of link processors and CCD processors. An exemplary cluster may be made up of 24 link processors, three CCD processor pairs and one TNC pair in an exemplary telecommunications network. As shown in FIG. 1, TNC 128 is coupled to multiple CCDs and multiple link processors. Those skilled in the relevant art will appreciate the functionality offered by the link processor 124, CCD 126, and TNC 128.

Figure 1A:
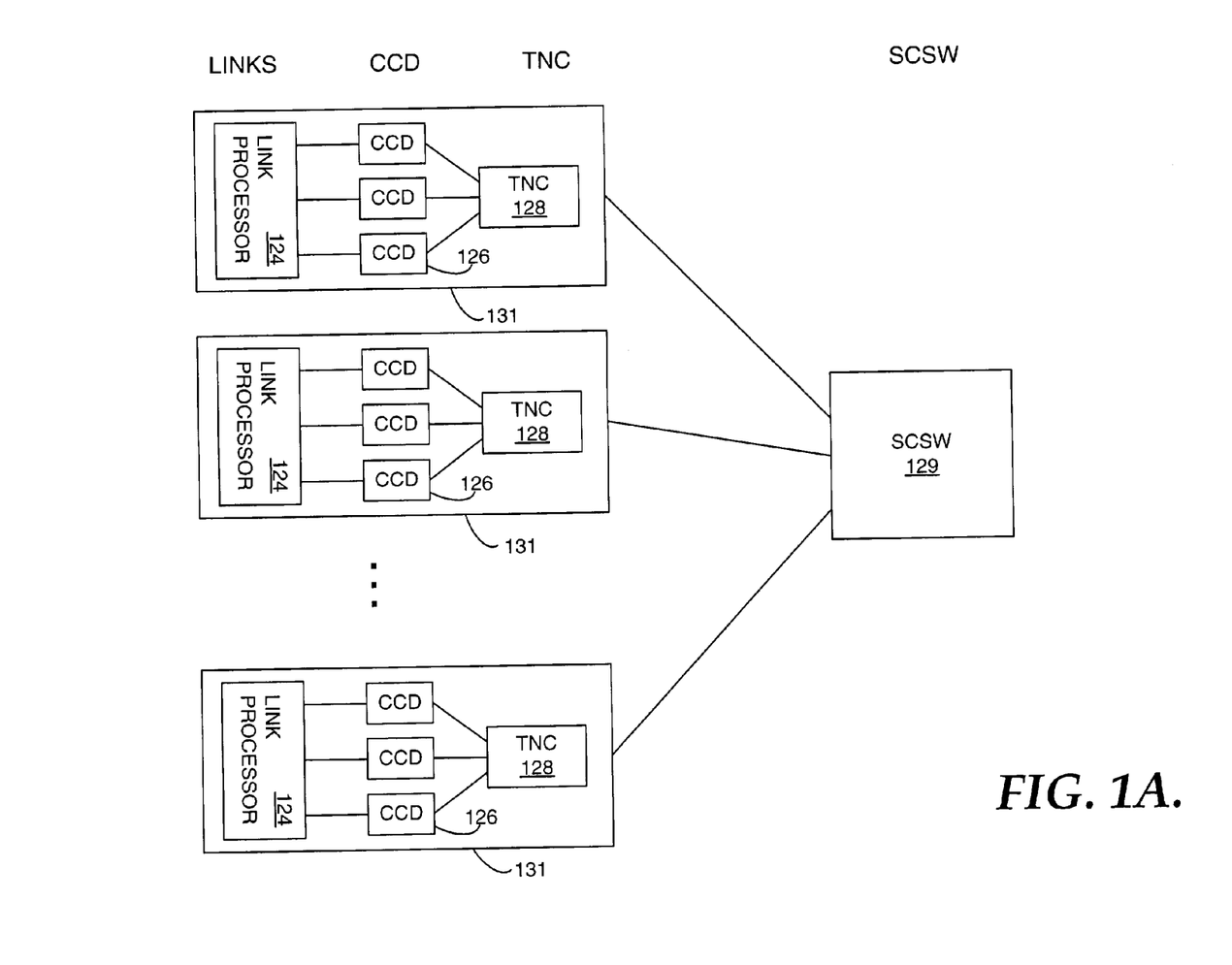
FIG. 1A is a block diagram depicts exemplary logical relationships between multiple link processors, CCDs, and TNCs as they relate to a super cluster switch.

Turning briefly to FIG. 1A, a block diagram is provided that depicts logical relationships between multiple link processors 124, CCDs 126, and TNCs 128 as they relate to a super cluster switch (SCSW 129). The SCSW 129, although known by other names, performs the functionality of routing data from one TNC cluster 131 to another. In an exemplary embodiment, up to twelve TNC clusters 131 are connected to each SCSW 129. Multiple SCSWs 129 can be within a single STP 123.

Returning to FIG. 1, The present invention, among other things, rapidly provides link information stored within STP 123. Link information includes information regarding the link numbers within the link processor and information regarding what links are associated with each of the available processor components, CCDs and TNCs for example. Link information includes the link numbers associated with a given CCD, TNC, and SCSW. Various other processor components can be contained or housed within STP 123. Link processor 124, CCD 126, TNC 128, and SCSW 129 are included as exemplary components that are associated with various links and link information. However, the invention should not be construed as limited to providing link information associated only with the link processor, CCD pair 126, and corresponding TNC 128. As will be explained in greater detail below, much of link information can be rapidly extracted using the present invention.

Absent faults, data typically flows from a first component into STP 123 and back to a second component. For example, local telephone company 112 may communicate data to STP 123, which then communicates data to a first carrier component 114. But in a fault situation, certain links may be affected which will in turn impede data flow. Such a fault would be observed by various link numbers failing.

Historically, it has been difficult to find a commonality associated with faulty links, or link numbers. Absent the present invention, it may take 45 minutes to an hour or longer to determine from a set of link numbers a commonality that can point to a solution that would restore data flow. Moreover, as links fail, STP 123 should notify the network of the failed links. If, however, STP 123 is incapable of or fails to notify an external network that certain links are in a fault state, then data traffic will continue to be communicated to STP 123. Persistent data traffic communicated to STP 123, which has faulty links, could contribute to additional link failures, cascading data-flow problems. If a commonality between link numbers can be found and diagnosed then corrective measures can be more readily implemented.

In a prior-art solution, depicted by dashed box 129, an analyst would attempt to access STP 123 by a remote PC 130 coupled to STP 123 via a network. Connecting to STP 123, however, may be difficult in light of its burdened state while attempting to service the data being communicated to it by the various telecommunications components 112–122. In this prior-art solution, the analyst would attempt to log on to the STP and perform diagnostics in real time. This link established from remote PC 130 to STP 123 is typically a slow-speed link. The analyst would enter a variety of commands to retrieve link information stored within STP 123.

Exemplary link information might include what CCD is associated with a certain link. Faulty links can be communicated to the analyst by a variety of means. For instance, the faulty links may be known and can be relayed to an analyst from a source nearby STP 123. But even if an analyst is aware of which links are faulty, [s]he must still search for a commonality between the links. In searching for this commonality, the analyst would, after logging onto STP 123, issue a set of commands to retrieve link information one at a time. For example, if links 2, 4, 8 are all faulty, a user must enter link 2 to determine its corresponding CCD. Without the aid of the present invention, the user would then enter another command to determine other links associated with the CCD servicing link 2. This process would need to be repeated for each link and could be frustrated by an inability to maintain communication with the STP.

In contrast to the prior art, the present invention utilizes a stand-alone computing device (such as PC 132) running an application 134. PC 132 does not have to be coupled, at least for the purpose of fault-time data communication, to STP 123. Although a personal computer is depicted in FIG. 1, the present invention can be run on a variety of personal-computing devices. Exemplary personal-computing devices include a notebook computer, tablet computer, personal data assistant (PDA), smart phone, etc. Those skilled in the art will appreciate additional computing devices that can run application 134, which presents a user with the link information stored within STP 123. Application 134 provides a user interface to accept an STP site and one or more link numbers to return link information stored within an STP, such as STP 123.

Figure 1B:
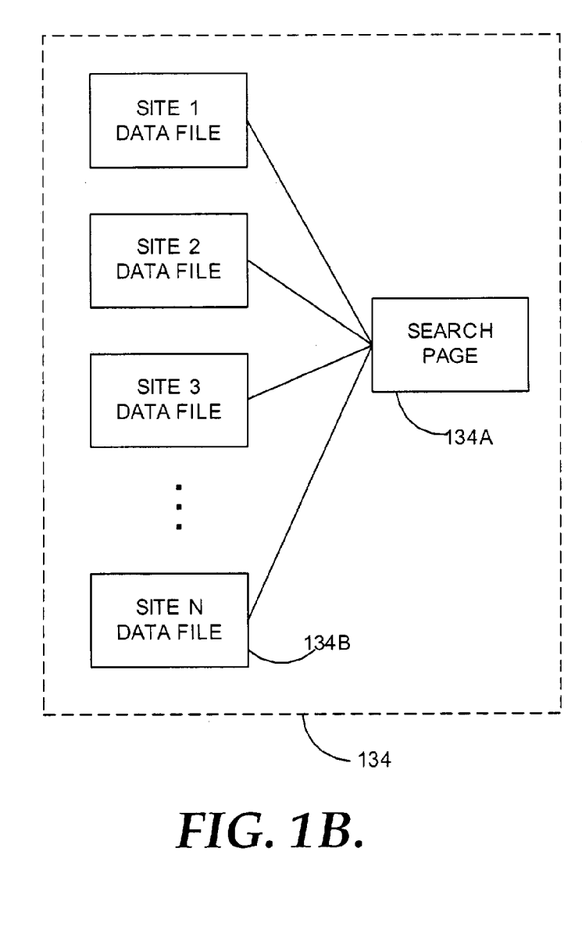
FIG. 1B is a block diagram depicting an exemplary topology of an application suitable for practicing the present invention.

FIG. 1B illustrates an exemplary embodiment of application 134 in greater detail. The functionality offered by application 134 is to provide link information stored within STP 123 without having to connect to STP 123 at the time the data is desired. Accordingly, those skilled in the art will appreciate that this functionality could be accomplished in literally hundreds of ways. Depicted in FIG. 1B is but one embodiment that accomplishes the functionality of being able to rapidly return to a user the link information stored within STP 123.

In a preferred embodiment, a search page is associated with a variety of data files, each corresponding to a specific site. In a typical telecommunications-network environment there is a single transfer point per site. Chicago, Dallas, and New York may each correspond to a site. Thus, in the preferred embodiment there would be a separate data file for Chicago, Dallas, and New York. As shown in FIG. 1B, search file 134A is affiliated with multiple data files such as data file 134B. Data files do not need to be separated per site. But in the preferred embodiment, the data files each correspond to a single site to simplify program administration.

Figure 1C:
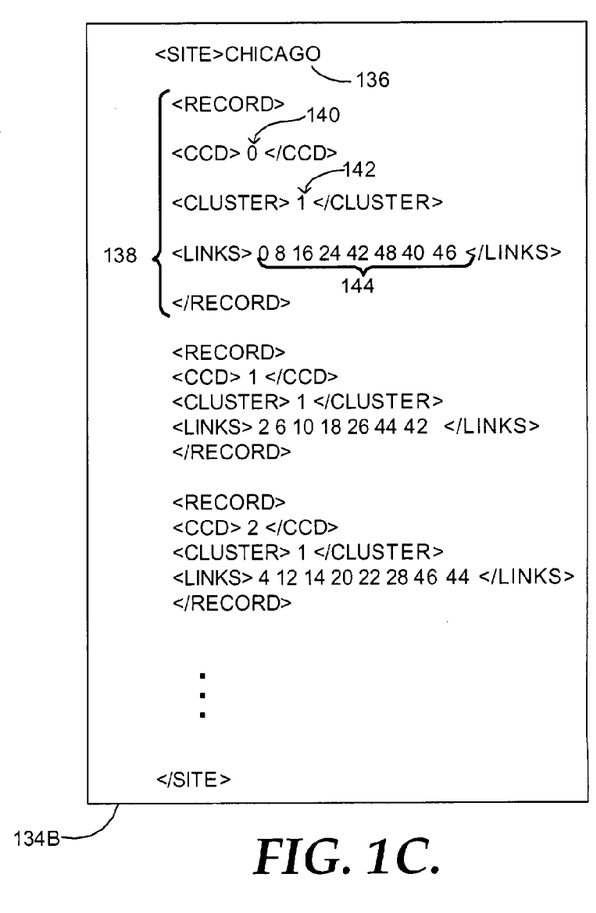
FIG. 1C provides exemplary pseudocode of a data file of FIG. 1B.

FIG. 1C provides pseudocode of the contents of exemplary data file 134B. As shown, the site is indicated by a site identifier 136, which in this case is "Chicago." An exemplary record set 138 includes a CCD identifier 140, cluster identifier 142, and a link set 144, which includes all of the links associated with the corresponding CCD and cluster identifier. A typical data file 134B may include many tens or even hundreds of record sets, such as exemplary record set 138. In a preferred embodiment, the data files are XML files and the search file is a Web page that includes an embedded script that carries out a functionality embodied in FIGS. 2 and 3. In this embodiment, application 134 becomes completely contained. That is, application 134 is portable, meaning it can be zipped, sent to a variety of personal-computing devices, unzipped, and run independently on that computing device.

Figure 2:
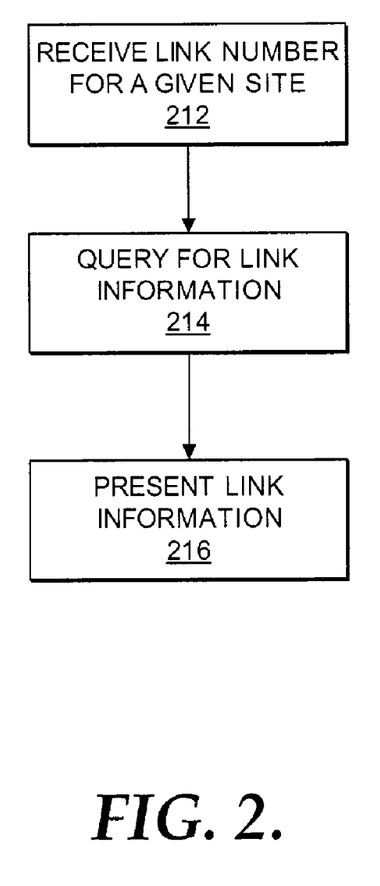
FIG. 2 is a high-level flowchart depicting the functionality carried out in an embodiment of the present invention.

FIG. 2 provides an illustrative embodiment of a method for carrying out the present invention. At a step 212, one or more link numbers are received by the present invention for a given site. The present invention then queries the various data files for link information at a step 214. One skilled in the art will appreciate that almost any type of data can be easily stored in a data file 134B by modifying the pseudocode illustrated in FIG. 1C. Finally, the link information is presented to an analyst at a step 216.

Figure 3:
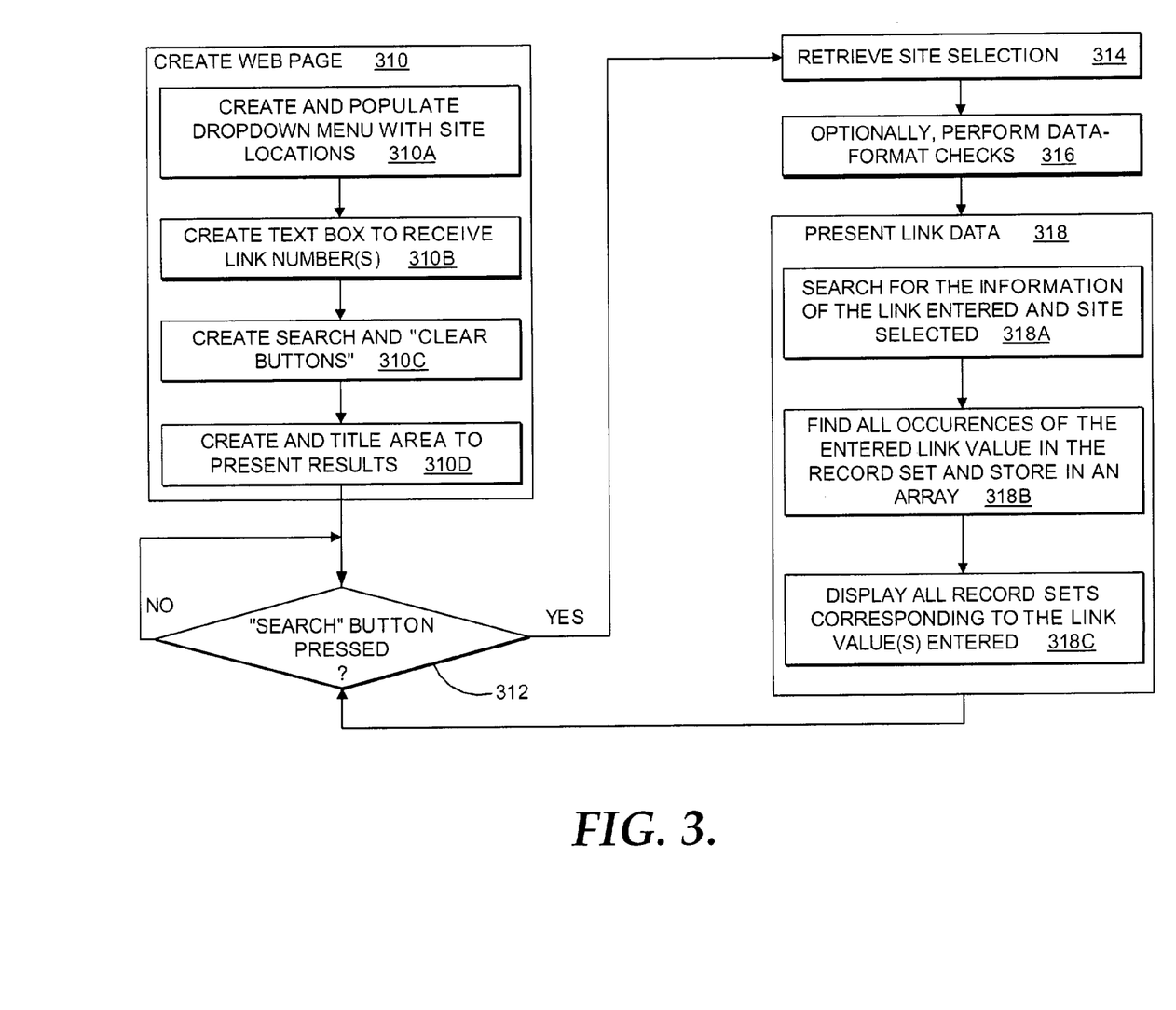
FIG. 3 is a more detailed flowchart depicting the functionality carried out in an embodiment of the present invention.

FIG. 3 illustrates a more detailed process for carrying out the present invention. The steps of FIG. 3 will be explained with reference to FIG. 4, an illustrative screen shot 410 of an embodiment of the present invention. FIG. 3 includes preprocessing steps for setting up the user interface that will depict link information to a user. Accordingly, not all steps are necessary to carry out the present invention. At a first step 310 a Web page is created. Creating the Web page happens once in a preferred embodiment whereby the present invention can then be executed as many times as is necessary to retrieve as much link information as is desired. Thus at a step 310A, a dropdown menu 416 is created and populated with the site locations. At a step 310B a text box 414 is created to receive one or more link numbers upon which to query. A search button 412 and clear button are included at a step 310C. At a step 310D, a title area is created to present query results. The substeps of creating Web page 310 need not be carried out in any particular order.

Figure 4:
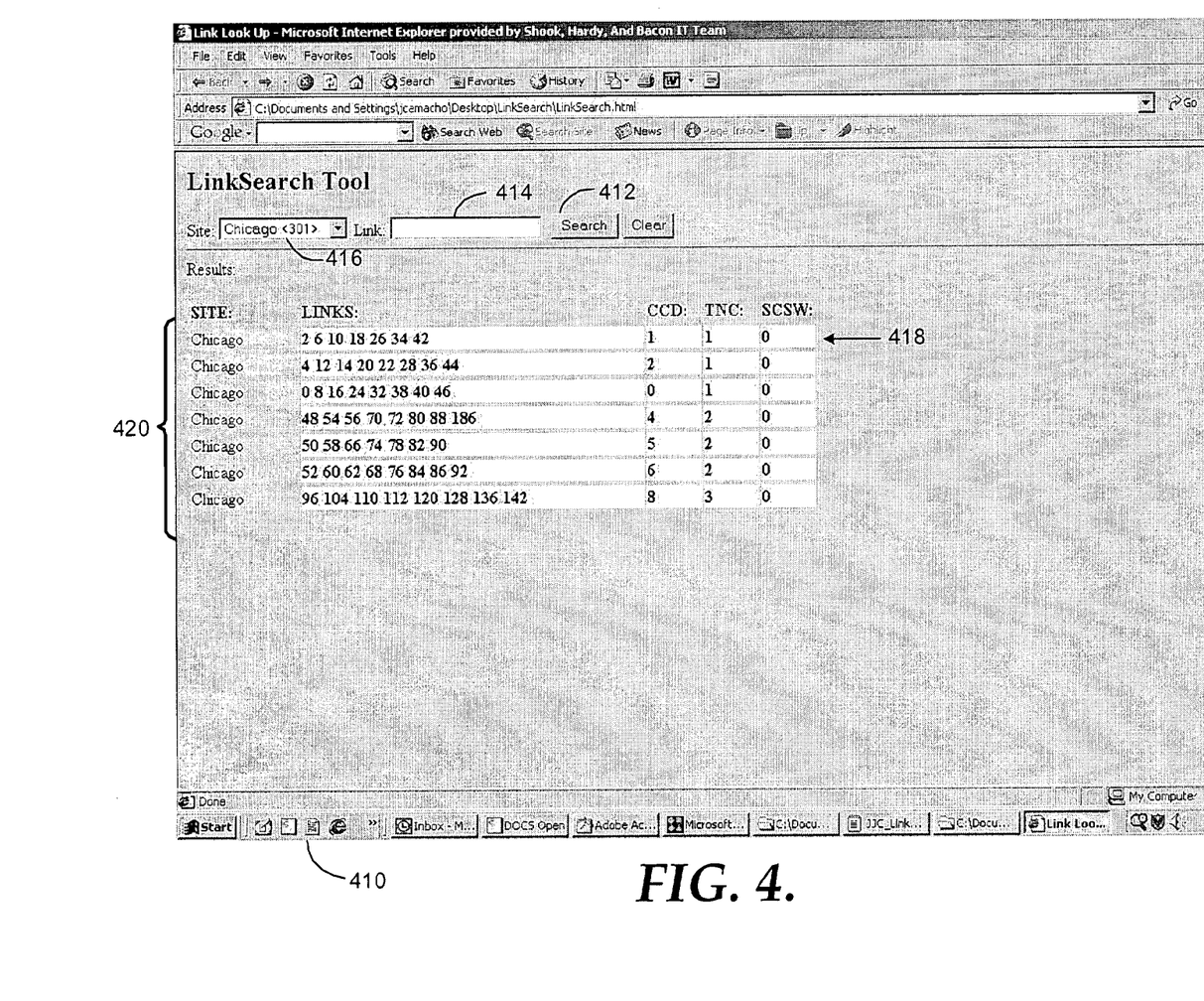
FIG. 4 is an exemplary screen shot illustrating various functional aspects of the present invention.

After search button 412 is pressed, or similar data-communication event, at a step 312, the one or more link numbers entered into the corresponding text box 414 will be searched upon if a site selection (such as "Chicago") is received at a step 314. Again, a site is selected from dropdown menu 416, which lists the various sites available to query. At a step 316, the present invention can optionally perform data-format checks. Exemplary data-format checks include making sure a value is entered into the link text box 414; confirming that the string entered into the text box is formatted correctly; checking to make sure a switch site was selected; and checking to see whether the value entered is within a prescribed range. At a step 318A, the present invention searches for the information related to the link(s) entered of the site selected.

In a preferred embodiment, a determination is made as to which data file to search. As described herein, each data file 134B corresponds to a specific site. Thus in a preferred embodiment, the file to search will be (but does not have to be) an XML file associated with a given site. At a step 318B, the present invention finds all occurrences of the entered link value in the record set and stores them in an array. This can be accomplished by retrieving to the first record of the appropriate record set, for example exemplary record set 138 of FIG. 1C. The present invention then searches through the various records until the link information is found or the last record is read. In this manner, the present invention would find all occurrences of the entered link value in the record sets and assign them to an array. The present invention would loop through the array and check to see if one of the values matches the entered value. If an entered value is found in a record set, then those values would be displayed.

Thus at a step 318C, the present invention displays all record sets corresponding to the link value(s) entered in a first row 418 of table 420. Table 420 is a conglomeration of rows wherein each row, in this embodiment, corresponds to a link query. The present invention moves on to the next record in the record set and completes this iterative process until the last record is found. If no match is found, an optional message with a suggestion can be provided to the user. An example follows with further reference to FIG. 4. The following example is provided for illustrative purposes. No limitations should be read into the claims below from the following example, as it is not exhaustive, but helps to illustrate certain functional aspects of the present invention.

The screen shot 410 of FIG. 4 is an illustrative screen shot depicting one embodiment of a results presentation 420 that is provided to a user. The Web page was created via step 310. As shown, a user has selected from the dropdown menu the site "Chicago." In this scenario, a remote analyst has been notified that certain links are in a fault condition at the Chicago site. An analyst at this point would need to determine a commonality between the links that are down. So, for this example, consider that an analyst is provided with information that indicates links 2, 10, 34, 12, and 22 are down. These are arbitrary link numbers (associated with processor components within STP 123) and do not correspond to any elements in any of the drawing figures. As described in the prior-art section above, a user would historically have had to enter each link in real time through a connection and retrieve link information associated with that link. Separate commands would have had to be entered for each link. The user would then have to enter additional commands to determine all links associated with each of the determined CCDs.

Using the present invention, however, it can be observed via screen shot 410 that upon entering a single link number, that link's corresponding CCD number is presented along with all the other links associated with that CCD as well as its corresponding TNC and SCSW. Thus, upon entering a link number of 2 and pressing the search button, a user would be presented with the first line of table 420, which indicates that links 2, 6, 10, 18, 26, 34, and 42 are associated with CCD number 1, TNC number 1, and SCSW number 0.

Given our example, a commonality immediately emerges. That is, links 2 and 10 are associated with a common CCD, namely CCD 1. Thus, there is an indication that CCD 1 may be faulty. Moreover, after entering link number 4, the second row of table 420 is generated, which indicates links 4, 12, 14, 20, 22, 28, 36, and 44 are associated with CCD number 2, TNC number 1, and SCSW numberO. By observing this second row of table 420, another commonality emerges.

That is, links 12 and 22 are associated with CCD number 2. Thus, CCD number 2 may be a faulty processor. Moreover, it can be observed that links 2, 6, 4, and 12 are all associated with TNC number 1. This trouble-shooting data greatly reduces the problem-solving time associated with restoring the faulty links.

Now, consider that the analyst is notified that link number 8 is also faulty. Using the present invention, the user simply types the number 8 into the link-search text box 414. Incident to pressing the search button 412, [s]he is immediately presented with all the links associated with the corresponding CCD, TNC and SCSW. For this example, the third row on table 420 is generated, which communicates that links 0, 8, 16, 24, 32, 38, 40, and 46 are all associated with CCD number 0, TNC number 1, SCSW number 0. Therefore, still another commonality emerges, which is that all of the faulty links found so far are associated with TNC number 1. Thus, a key aspect of the present invention is the format in which the data is presented on a user interface to a user.

As can be seen from screen shot 410, a tabular format provides a rapid determination of a commonality between faulty links. The prior-art method merely presents a haphazard listing in a textual-type format that is not conducive to problem diagnosis. Continuing with the example, if links 48 and 50 are determined to be bad, a user can simply enter 48 and 50 into the link-search text box 414 and query. Doing so would produce rows 4 and 5 of Table 412. Row 4 demonstrates that links 48, 54, 56, 70, 72, 80, 88, and 186 are all associated with CCD number 4, TNC number 2 and SCSW number 0. Row 5 of table 420 indicates that link numbers 50, 58, 66, 74, 78, 82, and 90 are all associated with CCD number 5, TNC number 2 and SCSW number 0. From this additional information, a commonality between links 48 and 50 emerges: both are serviced by a processor device, TNC number 2.

The last two rows illustrated on screen shot 410 and table 420 show the respective results of returning link information queried on links 52 and 96. Notice from the last row that links 96, 104, 110, 112, 120, 128, 136, and 142 are associated with TNC number 3, which is to this point a unique TNC. Thus, if link 96 is also reported to be down, that may be an aberration. That is to say, it is not associated with a common CCD or other links that are down and it is also not associated with a common TNC. However, SCSW number 0 is consistent with all of the link information. Thus, an analyst can at least be tipped off to begin investigating SCSW number 0 or TNCs numbers 1 and 2.

As previously mentioned, application 134 can be run on a variety of computing devices. Thus, if links go down at an inopportune time, say for instance 1 a.m., an analyst can be notified at his or her home. Upon notification, the analyst can use a PDA to launch the program after being told what links are down and immediately provide feedback as to a potential commonality associated with the faulty links. Thus, the present invention has the added advantage of not requiring a central server or an online connection to a server. That is, application 134 can be operated independently of any other computing device. Moreover, the present invention should not be construed as limited to only retrieving link data in an STP. Any information that is desired to be stored and retrieved can be stored in the data files illustrated in FIG. 1B. The data files can be easily populated by a data dump, which is well known in the art. Alternatively, the data files can be manually populated with the data to be subsequently retrieved. Those skilled in the art will also appreciate the fact that the present invention is not constrained to an SS7-related architecture. The present invention could be used to update data dynamically, however, a connection would need to be established between the stand-alone PC 132 and the STP 123.

In an alternative embodiment of the present invention, an updating program could poll the different devices upon which data retrieval is sought and automatically update the data files. Automatically updating the data files, such as data file 134B, would provide an ability to keep the data files as up-to-date as desired.

As can be seen, the present invention and its equivalents are well-adapted to provide a new and useful method for retrieving information from network components. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for troubleshooting data-flow problems at a signal transfer point (STP) of a telecommunications network, wherein said STP includes a plurality of subcomponents comprising communications-link (link) components and corresponding processor devices, the method comprising:
   receiving one or more link identifiers;
   querying STP information embodied on a computer-readable medium based on said one or more link identifiers, wherein said STP information includes a listing that associates at least a portion of said one or more link identifiers with one or more of said corresponding processor devices; and
   presenting to a user at least a portion of said listing, wherein the presented portion of said listing includes one or more of said corresponding processor devices associated with said one or more link identifiers.

2. The method of claim 1, wherein said STP information includes link identifiers and the corresponding processors.

3. The method of claim 2, wherein querying the STP information includes retrieving said link information associated with the one or more link identifiers.

4. The method of claim 3, wherein presenting link information includes depicting the retrieved link information on a display device.

5. The method of claim 4, wherein said display device includes a monitor, a personal-data-assistant (PDA) display, and a personal-electronics device.

6. One or more computer-readable media having computer-useable instructions embodied thereon for identifying link information of a signal transfer point (STP) in a telecommunications network, comprising:
   instructions for receiving one or more link identifiers;
   instructions for referencing one or more computer-readable files populated with said link information;

instructions for utilizing said link information to identify one or more processor devices associated with at least a portion of said one or more link identifiers; and instructions for presenting said identified one or more processor devices on a display device.

7. The computer-readable medium of claim 6, wherein said STP comprises at least one of the following: a telecommunications switch, a signaling server, and a routing component.

8. The computer-readable media of claim 7, wherein link information includes topology information associated with one or more links serviced by said STP.

9. The computer-readable media of claim 8, wherein topology information includes said one or more processor devices associated with the said one or more links.

10. The computer-readable media of claim 9, wherein the one or more processor devices includes at least one selection from the following:
- a common channel distributor (CCD);
- a transport node controller (TNC); and
- a physical-device identifier.

11. The computer-readable media of claim 9, wherein instructions for presenting comprise instructions for presenting each of said processor devices associated with the received link identifier and each link identifier associated with said processor devices.

12. The computer-readable media of claim 11, wherein instructions for presenting further comprise instructions for presenting each link identifier associated with said one more processor devices.

13. A method for troubleshooting a cause of dropped links in a telecommunications-networking environment comprising executing the computer-useable instructions of claim 6 on one or more computer components, wherein the one or more computer components includes at least one selection from the following: a desktop computer, a laptop computer, a consumer-electronic device, and a hand-held computer, including a personal data assistant (PDA).

14. In a telecommunications-network environment, a method for enabling a rapid determination of link information residing within one or more signal transfer points (STP) comprising:

embodying said link information on one or more computer-readable media, wherein said link information includes a listing that associates one or more link identifiers with one or more corresponding processor devices;

providing access to said embodied link information across a computer network; and responsive to an input identifying at least one of said one or more link identifiers, presenting to a user at least a portion of said listing that includes at least one of said one or more corresponding processor devices associated with the identified at least one link identifier.

15. The method of claim 14, wherein embodying said link information includes iteratively associating link information with a specific STP.

16. The method of claim 15, wherein iteratively associating link information with a specific STP comprises storing said link information in a plurality of files wherein each file contains link information for an STP.

17. The method of claim 16, wherein said files include a markup-language file.

18. The method of claim 15, wherein providing access to said embodied link information includes providing a user interface for receiving one or more STP selections and for presenting said link information.

19. The method of claim 18, wherein link information includes topology information associated with one or more links serviced by said STP.

20. The method of claim 19, wherein topology information includes one or more processor devices associated with the said one or more links.

21. The method of claim 20, wherein the one or more processor devices includes at least one selection from the following:
- a common channel distributor (CCD);
- a transport node controller (TNC); and
- a physical-device identifier.

22. A system for retrieving information stored within a telecommunications component, comprising:

one or more computer-readable media having said telecommunications-component information for a plurality of signal transfer points embodied thereon, wherein said telecommunications-component information includes information associating link identifiers and corresponding processors; and a user-interface component operationally coupled to said one or more computer-readable media for receiving a request related to said telecommunications-component information.

23. The system of claim 22, where said telecommunications component includes a data-management component.

24. The system of claim 23, wherein said data-management component comprises one or more selections from the following: a signal transfer point (STP), a telecommunications switch, a signaling-server component, and a routing component.

25. The system of claim 23, wherein said one or more computer-readable media comprise a collection of records related to said telecommunications-component information.

26. The system of claim 25, wherein said user-interface component comprises one or more controls for selecting one or more telecommunications-components upon which to query.

27. The system of claim 26, where said user-interface component further comprises a reporting component for presenting said telecommunications-component information.

28. One or more computer-readable media having computer-useable instructions embodied thereon for performing a method of identifying link information within a signal transfer point (STP), said method comprising:

generating a presentation page;

receiving one or more STP indicators upon which to query;

receiving one or more link indicators upon which to query;

initiating a query on a record set based on said one or more STP indications and said one or more link indicators, wherein said record set comprises at least a portion of said link information; and presenting a result of said query on said presentation page.

29. The media of claim 28, wherein said STP comprises one or more of a telecommunications switch, a processor-component array, and a communications router.

30. The media of claim 29, wherein one or more STP indicators include a site housing said STP.

31. The media of claim 30, wherein one or more link indicators include one or more link numbers.

* * * * *